United States Patent [19]

Orte

[11] Patent Number: 4,645,362

[45] Date of Patent: Feb. 24, 1987

[54] BRUSH-TYPE SEALS

[75] Inventor: Sven E. V. Orte, Gothenburg, Sweden

[73] Assignee: SKF Industrial Trading and Development Co. B.V., Netherlands

[21] Appl. No.: 533,670

[22] Filed: Dec. 17, 1974

Related U.S. Application Data

[63] Continuation of Ser. No. 341,506, Mar. 15, 1973, abandoned.

[30] Foreign Application Priority Data

Mar. 17, 1972 [SE] Sweden .............................. 3430/72

[51] Int. Cl.[4] .............................................. F16C 1/24
[52] U.S. Cl. ..................................... 384/485; 277/65; 277/82; 384/486
[58] Field of Search ............. 277/DIG. 6, 237, 53–57, 277/65, 82; 156/72; 384/482, 485, 486, 484, 490

[56] References Cited

U.S. PATENT DOCUMENTS

| | | | |
|---|---|---|---|
| 885,032 | 4/1908 | De Ferranti | 277/53 |
| 2,276,499 | 3/1942 | Loeding | 277/53 |
| 2,592,602 | 4/1952 | Saks | 156/72 |
| 2,654,433 | 10/1953 | Piety | 277/53 |
| 2,878,048 | 3/1959 | Peterson | 277/53 |
| 3,494,681 | 2/1970 | Anderson et al. | 384/482 |
| 3,639,016 | 1/1972 | Bourgeois | 384/482 |

FOREIGN PATENT DOCUMENTS

| | | | |
|---|---|---|---|
| 175567 | 4/1961 | Sweden | 277/53 |
| 701728 | 12/1953 | United Kingdom | 277/53 |
| 1112720 | 5/1968 | United Kingdom | 277/53 |

OTHER PUBLICATIONS

Pollard Power Transmission Equipment Catalogue, Jun. 1967, Cat. Ref. PT/2, Pollard Bearings Corp., New York, New York.

Primary Examiner—Richard A. Bertsch
Attorney, Agent, or Firm—Eugene E. Renz, Jr.

[57] ABSTRACT

Seal for a generally annular gap between a pair of relatively rotatable or reciprocatory annular machine members, one member having at least one continuous perimeter surface portion located in the gap or in contiguity to the gap, and the other member having a corresponding surface portion located in the gap or in contiguity to the gap, respectively, characterized by a first coating of an adhesive material applied to said one surface portion, and a second coating of a multitude of closely spaced short flexible fibers of a generally equal length supported in said adhesive material, and said fibers being generally oriented with respect to said one surface portion, each fiber being independently secured solely at one end by said adhesive to said one surface portion, and at least a plurality of the free fiber ends in anti-frictional contact with said corresponding surface portion of said other member.

23 Claims, 18 Drawing Figures

BRUSH-TYPE SEALS

This is a continuation of application Ser. No. 341,506 filed Mar. 15, 1973, now abandoned.

The present invention relates to a seal for a generally annular gap between a pair of relatively movable members, one member having at least one continuous perimeter surface portion located in the gap or in contiguity to the gap, and the other member having a corresponding surface portion located in the gap or in contiguity to the gap, respectively. The seal is especially suited to be used for sealing against dirt, e.g. in bearings or bearing housings.

In sealing a gap between a pair of relatively movable members it is previously known to use brush seals instead of conventional felt seals and axially and radially rubbing rubber seals and various kinds of gap-type and labyrinth seals. Such brush seals may comprise, for example, a strip having on one side thereof fibres orientated perpendicularly to the strip. The strip is attached to one of said members and the free ends of the fibers are in wiping contact with the other member.

However, the brushes used hitherto for this purpose have been relatively complicated, and therefore expensive to manufacture, since the used strip has to be of a special material and since the fibres have to be orientated perpendicularly to the strip by mechanical means before they are secured to the strip, and therefore, the fibres have to be rather long.

The main object of the present invention is to provide a seal of the aforementioned kind, which seals effectively against dirt and the like and is extraordinarily simple and inexpensive to manufacture and further may have nearly any arbitrary cross sectional shape and the fibres of which for manufacturing reasons do not have to have a certain minimum length. According to the present invention these advantages are achieved in a seal of the kind stated introductively, in that said one surface portion is provided with a first coating of an adhesive material synthetic resin adhesive or other binder, preferably a thermosetting adhesive such as polyurethane glue, and a second coating of a multitude of closely spaced flexible fibers of generally equal length, each fiber having one end secured to a surface element of said one surface portion by means of the adhesive, and at least a plurality of the free fiber ends wiping lightly in antifrictional contact with said corresponding surface portion of said other member.

Some advantageous embodiments of the present invention will now be described with reference to the enclosed drawings.

Figure 1:
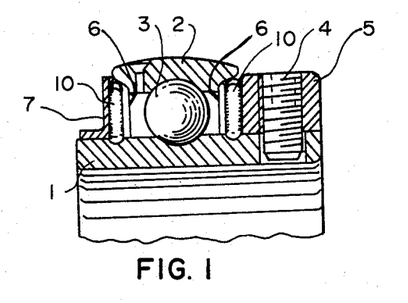
FIG. 1 is a fragment of an axial sectional view of a ball bearing in which one type of seal according to the present invention is incorporated.

In FIG. 1 is shown a deep groove ball bearing having an extended inner race ring 1 and an outer race ring 2 and balls 3 interposed therebetween. A locking collar 5 having at least one set screw 4 is provided on the inner race ring for locking it to a shaft (not shown). Sealing washers 6 are fitted in grooves provided in the hole of the outer race ring on each side of the raceway for the balls. The axial end face of collar 5 facing the sealing washers as well as one side of a flinger disc 7 provided on the inner race ring 1 at the opposite side of the bearing constitutes a continuous perimeter surface portion. This surface portion is provided with a first coating (FIG. 2) of a synthetic resin adhesive or other binder, preferably a thermosetting adhesive such as polyurethane glue, and a second coating 10 of a multitude of closely spaced flexible fibres 18 (FIG. 2) of generally equal length. Each fibre 18 has one end secured to a surface element of said surface portion by means of the adhesive. The fibres span an annular gap formed between the outer race ring 2 sealing washer 6 assembly and the locking collar 5 or flinger disc 7, respectively, and the free fibre ends wipe lightly in antifrictional contact with a surface portion located on said assembly and corresponding to the continuous perimeter surface portion. As illustrated in FIG. 1 the corresponding surface portion preferably comprises at least the radially inner portion of the axial end face of the outer race ring 2 as well as the radially outer portion of the exterior of each sealing washer 6.

The second coating 10 consists of electrostatically deposited flock fibres, preferably of a synthetic resin material, such as polyamide. Processes and apparatus for electrostatically depositing flock fibres on a substrate are old (cf. U.S. Pat. Nos. 2,173,032; 2,221,338; 2,336,745; 2,247,963; 2,425,652; 2,527,501; 2,592,602 and 3,389,579 and Canadian Pat. No. 479,254) and form no part of the present invention. The above processes provide coatings wherein the fibres are orientated substantially perpendicularly from the adhesive, such as is generally preferred in the present invention. However, in some cases it may be desirable to orient the fibers at controlled angles of, for example, forty to sixty degrees to the adhesive surfaces. Processes of electrostatically depositing flock fibres on a surface at relatively controlled angles are disclosed in the U.S. Pat. Nos.

2,152,077; 2,174,328 and 2,217,126. By using the above mentioned electrostatical methods for depositing flock fibres on a carrying member, the fibres do not have to be oriented by mechanical means and, therefore, the fibre length has no lower limit determined by manufacturing requirements.

Figure 2:
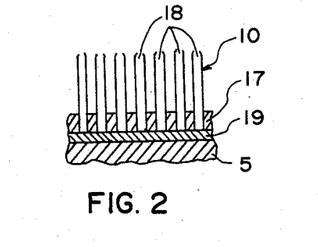
FIG. 2 is an enlarged fragment of FIG. 1 and illustrates part of a carrier having a coating of closely spaced fibers securely bonded thereto and orientated perpendicularly thereto.

FIG. 2 further illustrates that for heavy duty purposes a third coating 19 of a primer, preferably a two-component primer, may be provided between the carrying member (i.e. in FIG. 2 the locking collar 5) and the first coating 17 of an adhesive in order to effectively bond the first coating 17 and, thus, the fibers 18 to the carrying member.

With reference to FIG. 1 it is also possible, but not preferred to use the outer race ring 2 sealing washer 6 assembly as the carrying member for the coatings and let the free fiber ends wipe lightly in antifrictional contact with the axial end faces of the locking collar 5 and flinger disc 7.

Figure 3:
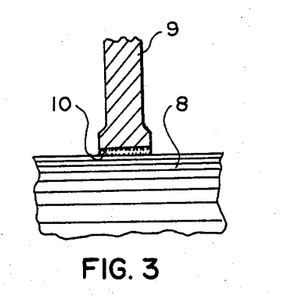
FIG. 3 is a fragment of a longitudinal sectional view of a simple type of rod seal embodying the invention.

Further, in the embodiment illustrated in FIG. 1 the length of the fibres used usually is about two or three millimeters but, if desired, it is of course possible to use considerably longer or shorter fibres. For example, when sealing gaps having a small clearance width it is desirable to use short fibers having a length which only slightly exceeds the width or the clearance. Such a case is illustrated in FIG. 3. A gap or clearance is formed between a relatively reciprocatable rod (or rotatable shaft) 8 and a partition 9 incorporated in a bearing housing or the like and having a bore through which the rod or shaft passes. The fibre flock 10 may be bonded as described above either to the inner wall of the bore, which is preferred with a reciprocatable rod, or direct to a shaft portion surrounded by the bore. It is also possible to bond the fibre flock to a separate strip or the like, and then secure the flock coated strip to the shaft or to the inner wall of the bore.

Foreign matter, such as chips, grit, plastic dust, fibers, or other airborne material, can be disastrous to rolling-element linear-motion bearings. Hard chips in the path of the balls cause ball spalling or fracture and can damage the races. Any dirt or grit between race and rolling elements produces wear, and the balls or rollers suffer progressive lapping that results in increased play. Plastic dust and fibers are particularly bad in recirculating bearings because the material tends to pack into the recirculating channels, and eventually prevents the passage of the balls of rollers. With ball spline assemblies and the like the sealing problem is hard to solve because the balls roll in grooves provided on the shaft, rod or beam member along which the ball spline or the like is relatively displaceable, and since said member is grooved it has a non-circular cross section.

Figure 4:
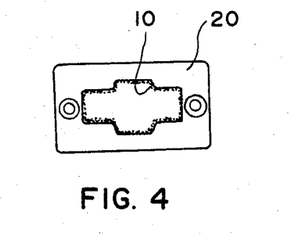
FIG. 4 is a plan view of an apertured end cover for a rolling-element linear-motion bearing, the aperture being non-circular and having a coating of closely spaced fibers of generally equal length.

FIG. 4 illustrates a positive very effective seal showing an end plate 20 of a linear-motion bearing housing. The end plate has a bore conforming to the cross section of a beam member (not shown) which is basically double-T-shaped in such a manner that the cross bars of the T-profiles are located with their longitudinal sides against each other and are formed as an integral unit while the respective webs of the profiles are oriented in each others elongations. The raceways for the balls are arranged in each junction between web and crossbar portions. The fibre flock 10 provided on the inner wall of the bore of the end plate 20 and bonded thereto as described above is very effective at keeping out dust and other foreign matter.

Figure 5:
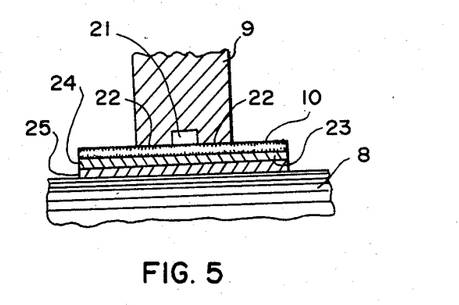
FIG. 5 is a fragment of a longitudinal sectional view of a more elaborate type of rod seal.

FIG. 5 illustrates an axially displaceable axially and radially rubbing seal, which requires just a small space. As in FIG. 3 a partition 9, such as an end cover of a bearing housing, has a bore through which a rotatable shaft 8 passes. An annular groove 21 is provided centrally in the bore and is adapted to serve as a grease reservoir, and smaller grooves 22 are provided on both sides of the larger groove 21 in the bore. The smaller grooves are relatively shallow and may be annular or helical and of arbitrary cross section. The fibre flock 10 is provided on the radially outer surface of a sleeve 23 fitted on the shaft 8. At least the inner periphery of the sleeve is resilient to facilitate the fitting of the sleeve around the shaft. Preferably, the sleeve 23 is of sandwich structure and comprises a metal sleeve 24 having an inner liner 25 of rubber or plastic. The fibre flock 10 projects into the grooves and shapes itself to match the grooves axially as well as radially, If the smaller grooves 22 are helical, dirt will be driven out from the seal or grease will be retained in the housing depending on the direction of rotation of the shaft 8. The length of the flock coated sleeve 23 exceeds the thickness of the partition 9 to permit the rotatable shaft 8 to make small axial movements relative to the partition without impairing the sealing effect.

Figure 6:
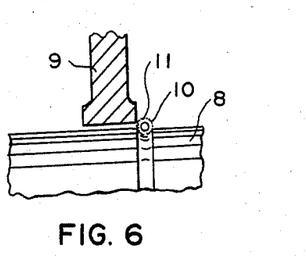
FIG. 6 is a fragment of a longitudinal sectional view of another type of rod seal, wherein the sealing member is ring-shaped.

In FIG. 6 is illustrated another method for sealing of a clearance between a rotatable shaft 8 and a bore provided in a partition 9, such as an end cover of a bearing housing. On the shaft and in contiguity to one end of the bore, possibly in a groove on the shaft, is provided a fibre flock 10 coated seal ring 11 of, for instance, rubber or in the shape of a garter spring. The free fibre ends wipe lightly in contact with the radial end face of the partition 9, but also with an end portion of the inner wall of the bore, whereby an efficient seal against dirt pressing in from the right hand side of FIG. 6 is obtained. A preferred type of fibre flock coated garter spring is illustrated in FIGS. 7 and 8.

Figure 7:
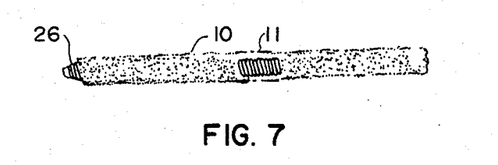
FIGS. 7 and 8 are plan views of a fibre flock coated dividable garter spring in open and closed condition, respectively, said spring being adapted for use in the rod seal of FIG. 6.
Figure 8:
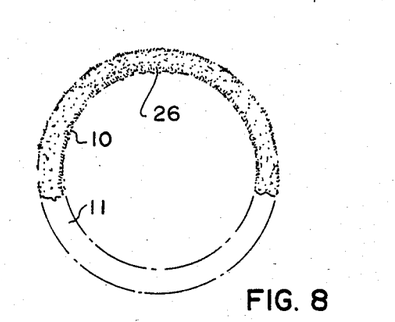

As shown in FIG. 7 the garter spring 11 is dividable and has a tapered end 26 screwable into the other end to form a closed ring. Preferably, at least part of one of the coils at the tapered end 26 projects outwards to give a vibration-proof joint when the ends are screwed together.

Apart from the tapered end 26 the entire exterior of the garter spring 11 is coated with fibre flock. To produce the fibre flock coated garter spring 11 the following steps are performed. First a helical spring, which has a predetermined length and a tapered end screwable into the other end for forming a closed ring, is stretched sufficiently, preferably about 10 percent, to temporarily space the non-tapered coils from each other. Then a thermosetting synthetic resin adhesive, such as polyurethane glue, is applied onto the non-tapered coils while in the temporarily spaced condition. Thereafter fibre flock is electrostatically deposited on the helical spring while in the stretched condition, and finally, the adhesive is made to set, the helical spring is relaxed, and the tapered end is screwed into the other end. If desired, also the tapered end may be coated with fibre flock, and it is also possible, but not preferred, to join the two ends of the helical spring in some other way.

An additional advantage is obtained if the space confined within the coils of the flock coated garter spring 11 is filled with grease prior to use. When the ends of the spring are joined during the mounting of the flock coated garter spring around a shaft, the individual coil portions at the outer periphery of the formed ring will be separated from each other by small gaps. During the rotation of the shaft and of the flock coated garter spring seated thereon small amounts of oil will emanate from the grease and pass out through the small gaps to the fibres. The oil does not only keep the fibres lubricated but it also increases the labyrinth seal effect of the fibres.

When high rotational speeds are used there is some risk of the fibre flock coated garter spring lifting from the shaft due to the centrifugal force. This lifting may be prevented by using a thin metal wire within the garter spring, the wire ends being led out a few coils from the respective garter spring ends. After screwing the garter spring ends together when mounting the garter spring around a shaft, the wire ends are fastened together to secure the garter spring to the shaft.

Figure 9:
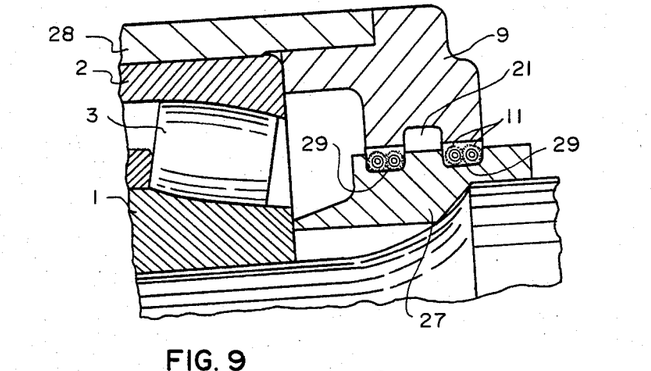
FIG. 9 is a fragment of a longitudinal sectional view of a sealed railway axle box utilizing as sealing members a number of the flock coated garter springs of FIGS. 7 and 8.

FIG. 9 illustrates a railway axle-box mounted on a shaft 8 and having a spherical roller bearing, the inner race ring 1 of which is fitted on the shaft 8. The outer race ring 2 is fitted in the body portion 28 of an axle-box housing and spherical rollers 3 are provided between and in rolling contact with the race rings. A partition 9 or end cover is secured to one end of the body portion and supports the outer race ring axially in one direction. The partition 9 has a bore coaxial with the shaft 8 and an annular groove 21 is provided centrally in the bore and serves as a grease reservoir. A collar 27 is fitted on the shaft 8, extends through the bore and supports the inner race ring 1 axially in said one direction. In the outer cylindrical surface of the collar 27 there are arranged two annular grooves 29 spaced apart a distance corresponding to the width of the central groove 21. Each groove 29 accommodates two fiber flock coated dividable garter springs 11 of the kind illustrated in FIGS. 7 and 8, and the land portions on each side of the central groove 21 have a width corresponding to that of the two grooves 29. The outermost flock fibres (with reference to the shaft axis) of each garter spring wipe lightly in contact with the land portions. A wheel (not shown) is secured to the enlarged shaft portion shown in the right-hand part of FIG. 9. With conventional seals instead of the fibre flock coated dividable garter springs 11 it would be necessary to demount the railway box bearings to replace a worn out seal, but that problem is eliminated with the seal of the present invention.

Figure 10:
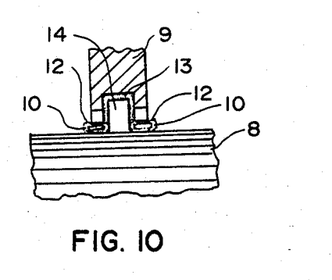
FIGS. 10 and 11 are fragments of longitudinal sectional views of two further types of rod seals permitting axial displacement of the rod or shaft with respect to a partition through which the rod or shaft passes.

In FIG. 10 there is illustrated a further method of sealing a gap between a shaft 8 and a bore provided in a partition 9. Here a seal ring of generally U-shaped cross section and having axially outwards projecting flanges 12 is fitted in a groove provided in the inner wall of the bore. The flange surfaces facing the shaft 8 are coated with fibre flock 10 for wiping contact with the shaft 8, and the channel space within the U-shaped portion 13 is adapted to serve as a grease reservoir 14.

Figure 11:
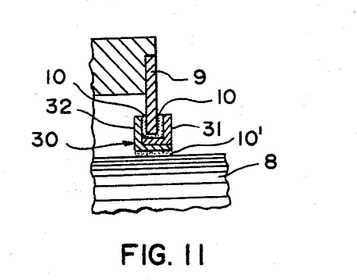

FIG. 11 illustrates an axially rubbing seal which may be made so as to permit axial relative movements. A partition 9 having a bore is a part of a bearing housing or the like. A rotatable shaft 8 passes through the bore. A ring member 30 of generally U-shaped cross section is fitted on the shaft 8 and rotatable therewith. As illustrated, the inner periphery of the ring member 30, i.e. the bottom portion of the U, carries a coating 10' of electrostatically deposited flock fibers, which are bonded to the ring member as described above and together give a relatively tight grip around the shaft 8. However, the grip should be loose enough to permit the ring member 30 to be displaced axially relative to the shaft 8 when the shaft 8 or the ring member 30 is subjected to an axial force exceeding a predetermined level. Where the axial displaceability feature is unnecessary the coating 10' of fibres on the inner periphery of the ring member 30 may be dispensed with, and the ring member will then be seated direct on the shaft 8. It is also possible to replace the fibre flock on the inner periphery of the ring-member with a liner of a low friction material, such as polytetrafluoroethylene or polyamide or other solid lubricant or dry-film lubricant.

Preferably, the ring member 30 consists of two rings of substantially L-shaped cross sections, one ring 31 having a slightly larger inner diametre than the other 32 at the bottom portion of the L, so that the bottom portions engage each other radially to form the ring member 30 of generally U-shaped cross section. The partition 9 has two oppositely facing annular surface portions extending into the channel space formed by the two rings 31 and 32, but the partition 9 does not touch any part of the ring member 30. A coating 10 of electrostatically deposited flock fibres is provided on each of the two annular surface portions and bended to the partition as described above. The free fibre ends wipe lightly in antifrictional contact with corresponding surface portions on the radially extending inner walls of the rings 31 and 32. However, it is also possible and equally preferred to bond the fibre flock 10 to said corresponding surface portions of the rings 31 and 32 and to have the free fibre ends wiping lightly in antifrictional contact with said annular surface portions of the partition 9. The frictional drag created by the two coatings 10 should be considerably less than that created by the coating 10' in order to ensure that the ring member 30 normally rotates with the same angular velocity as the shaft 8.

Figure 12:
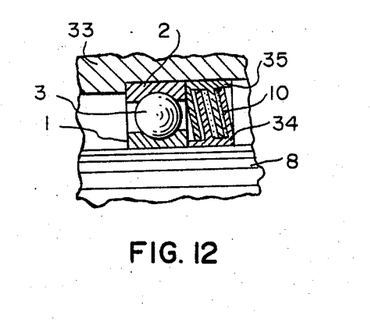
FIGS. 12, 13, 14 and 15 are fragments of longitudinal sectional views of four antifriction bearings embodying four further types of seals according to the present invention.

Another type of preferred seal assembly is shown in FIG. 12. A shaft 8 is journalled in a bearing housing 33 by means of at least one bearing. The illustrated bearing is a deep groove ball bearing having an inner race ring 1 fitted on the shaft 8, an outer race ring 2 fitted in the housing 33, and a plurality of balls 3 provided between and in rolling contact with the race rings. Two seal assemblies of labyrinth type are shown mounted in tandem on one side of the bearing, but usually one single seal assembly is sufficient for obtaining the desired sealing efficiency. Each seal assembly consists of two pressed steel sealing washers of generally L-shaped cross section, one being a shaft washer 34 and the other a housing washer 35. Each sealing washer has a dished body portion and a short substantially cylindrical portion, which in the shaft washer 34 is provided at the inner periphery of the dished portion, and in the housing washer 35 is provided at the outer periphery of the dished portion. To ensure a close fit on their respective seatings, the inner and outer fitting surfaces of the washers (i.e. of the substantially cylindrical washer portions) may be slightly tapered. The angle formed at the junction of the dished portion and the cylindrical portion is slightly less than 90 degrees, preferably about 80 degrees. The outer diameter of the shaft washer 34 is slightly smaller than the inner diameter of the cylindrical portion of the housing washer 35, and the inner diameter of the housing washer 35 is slightly larger than the outer diameter of the cylindrical portion of the shaft washer 34. The two sealing washers of the seal assembly should always be mounted in such a way that the dished portion of one of the sealing washers is located entirely within a space defined axially by the dished portion of the other sealing washer and a radial plane through the end face of the cylindrical portion of said other sealing washer. Then an axial clearance of constant width is formed between the shaft washer 34 and the housing washer 35. The clearance is bridged by a coating 10 of electrostatically deposited fibre flock bonded to one of the dished portions, preferably that of the shaft washer 34, in the same manner as described above, and the free fibre ends wipe lightly in antifrictional contact with the dished portion of the other sealing washer. It is also preferred to mount the shaft washer 34 axially outside the housing washer 35.

Figure 13:
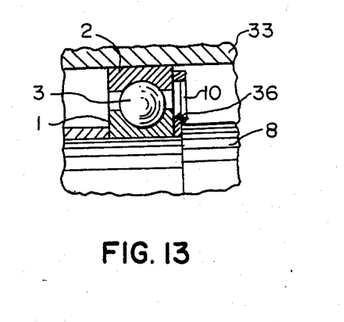

Another type of preferred seal according to the present invention is illustrated in FIG. 13. A rotatable shaft 8 is journalled in a bearing housing 33 by means of at least one bearing. The illustrated bearing is a deep groove ball bearing having an inner race ring 1 fitted on the shaft 8, an outer race ring 2 fitted in the housing 33, and a plurality of balls 3 provided between and in rolling contact with the race rings. The inner race ring 1 is axially secured by a distance ring and a shoulder provided on the shaft 8. A disc 36 having an outer diameter slightly smaller than that of the outer race ring 2 is clamped between the inner race ring 1 and the shoulder. The disc 36 has a plane inner portion, a truncated intermediary portion, and a plane outer portion spaced from an axial end face of the outer race ring 2 by a clearance of constant width. A coating 10 of electrostatically deposited fibre flock is bonded, in the same manner as described above, to one of the surfaces defining the clearance axially. Preferably, said one surface is located on the disc 36, and the free fibre ends wipe lightly in antifrictional contact with said end face of the outer race ring 2.

Figure 14:
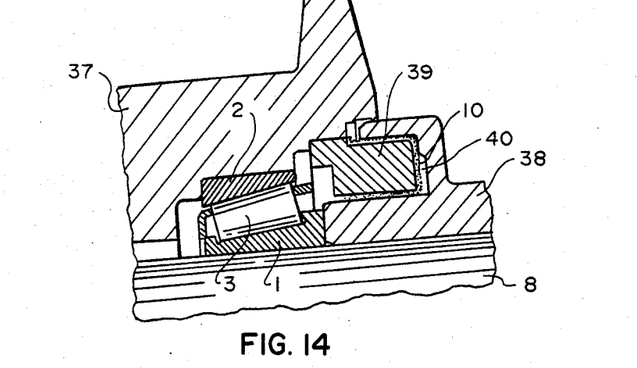

FIG. 14 shows a track roller assembly for one of the two tracks of a tracklayer or the like. The track roller 37 is journalled on a shaft 8 by means of two taper roller bearings of which one is shown. Each bearing has an inner ring 1 fitted on the shaft 8, an outer ring 2 fitted in the track roller 37, and a plurality of taper rollers 3 interposed between and in rolling contact with the race rings. A closure member 38 is fitted on the shaft 8 and has an axial end face abutting the larger end face of the inner race ring 1. An annular groove is provided in the closure member 38 and has two cylindrical side surfaces which are concentric with the shaft 8, and a bottom surface extending radially with respect to the shaft axis. A seal ring 39 is secured to the track roller 37 and has an axial end portion conforming in shape to the annular groove but having somewhat smaller dimensions, so that a clearance is provided between the seal ring 39 and the sides and bottom of the groove. On the seal ring surfaces, which correspond to the bottom and side surfaces of the groove, there is provided a coating 10 of electrostatically deposited fibre flock bonded to the seal ring 39 in the same way as described above, and the free fibre ends wipe lightly in antifrictional contact with the sides and bottom of the groove. Preferably, the groove bottom is stepped in radial direction for forming at the radially inner part of the groove bottom an annular space 40 adapted to serve as a grease reservoir.

Figure 15:
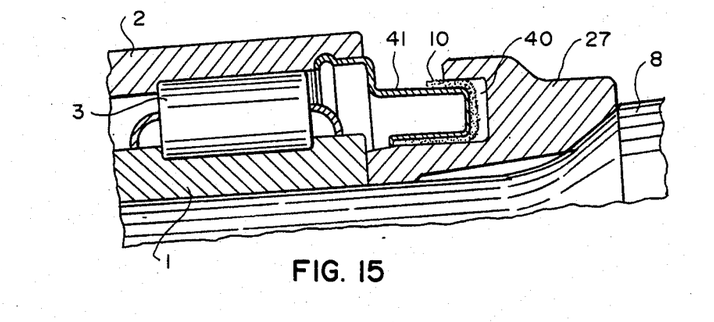

A modification of the sealing concept just described is illustrated in FIG. 15 showing a railway bearing unit mounted on a journal 8. The railway bearing unit comprises a low sectional height double-row cylindrical roller bearing having an inner race ring 1 mounted on the journal 8, an outer race ring 2 and cylindrical rollers 3. A collar 27 is fitted on the journal 8 on the wheel side of the bearing and an axle cap (not shown) is provided on the other side thereof. An adapter (not shown) engages at least the upper portion of the outer race ring 2 and usually is made to fit a standard pedestal type side frame. An annular groove is provided in the collar 27 and an identical groove is provided in the axle cap. The grooves have cylindrical sides and plane bottoms and face each other. Axially outside each roller set within the bore of the outer race ring 2 there is also an annular groove. A seal ring 41 of pressed sheet steel has one generally cylindrical end portion matching the bore and the groove of the outer race ring 2, the other end portion being of substantially square edged generally C-shaped cross section and matching the groove of the collar (or axle cap, respectively). Said other end portion of the seal ring 41 carriers a coating 10 of electrostatically deposited fibre flock bonded to the seal ring 41 in a manner similar to the one described above, and there is sufficient radial clearance between the seal ring and the cylindrical sides of the collar groove to permit the free fibre ends to wipe lightly in antifrictional contact with the groove sides. The axial gap between the seal ring 41 and the bottom of the collar groove is sufficiently large for serving as a grease reservoir 40.

Figure 16:
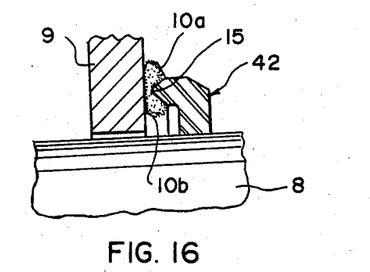
FIGS. 16, 17 and 18 are fragments of longitudinal sectional views of three different lip seal rings having a coating of flocked fibers in contiguity to the edge of the lip.
Figure 17:
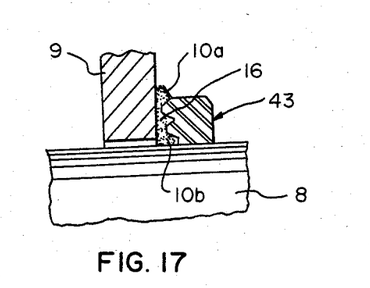
Figure 18:
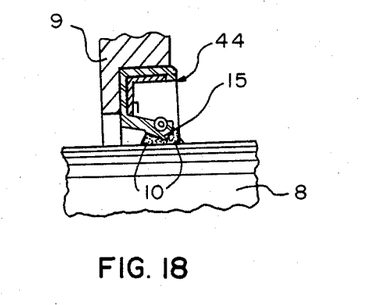

In FIGS. 16, 17 and 18 there are shown conventional rubbing lip seals which, however, at a portion contiguous to the or each sealing lip edge have a coating 10 of electrostatically deposited fibre flock bonded to the lip in the same manner as described above.

FIG. 16 illustrates a rotatable shaft 8 passing through a bore provided in a partition 9. A seal ring 42 of rubber is mounted on the shaft 8 and has an axially projecting single sealing lip 15 engaging a radially extending wall surface of the partition 9. Both sides of the lip 15 carry a coating of fibre flock. The radially out coating 10 a of fibre flock, i.e. the one on the exterior side of the seal, works as bristles keeping dirt away from the lip edge and the engagement surface of the partition 9, whereby the wear thereof is reduced. The radially inner coating 10b of fibre flock, i.e. the one on the interior side of the seal, is smeared with grease and works as a lubricant reservoir, from which oil, bleeding from the grease, is given off to the engagement surface, whereby friction is reduced.

A seal ring 43 having double lips is illustrated in FIG. 17 and works in a manner corresponding to that of the seal ring of FIG. 16. The space 16 between the lips is suitably filled with grease, whereby the seal friction will be low simultaneously as dirt, possibly penetrating the outer coating 10 a of fibre flock and the outer sealing lip, is effectively collected here.

In FIG. 18 there is shown a rotary shaft oil seal unit 44 mounted in a stepped bore of a partition 9 and engaging with a rotatable shaft 8. The lip 15 of the seal unit 44 is in a manner corresponding to that of FIGS. 16 and 17 coated with fibre flock 10 on both sides of the lip edge and the fibre flock works as described in connection to FIGS. 16 and 17.

While some specific embodiments of the invention have been described in detail above, it is to be understood that various modifications may be made from the specific details described without departing from the spirit and scope of the invention.

I claim:

1. In a ball bearing assembly of the type including an inner bearing ring and an outer bearing ring supporting a plurality of balls therebetween, said inner bearing ring being in the form of a sleeve which projects axially outwardly of a side face of the outer bearing ring, said face being defined by inner and outer peripheral edges, the space for the balls between the inner and outer bearing rings being protected by sealing means mounted in said space inwardly of said side face of the outer ring against entrance of water and dirt, the improvement wherein said bearing comprises a first rigid substantially plane washer of considerable thickness secured to the outwardly projecting end portion of said inner sleeve-shaped bearing ring, the outer periphery of said washer extending radially past said inner edge of said outer bearing ring, said washer overlying and adjoining at least a portion of the side face of said outer bearing ring, and a second protection means located inwardly of and adjacent said first washer within the space between said bearing rings.

2. A bearing assembly of the type including an inner bearing ring and an outer bearing ring, the inner bearing ring being in the form of a sleeve which projects axially outwardly of a side face of the outer bearing ring, which face is defined by an inner edge and an outer edge, the space for the balls between the inner and outer bearing rings being protected by sealing means mounted in said space inwardly of the side face of the outer ring against entrance of water and dirt, said bearing comprising a first rigid substantially plane washer of considerable thickness secured to the outwardly projecting end of the inner sleeve-shaped bearing ring, the outer periphery of said washer extending past the inner edge of the outer bearing ring, said washer adjoining the side face of the outer bearing ring, and a second protection means including a flocculent coating arranged on the inside of said first washer.

3. A bearing assembly of the type including an inner bearing ring and an outer bearing ring, the inner bearing ring being in the form of a sleeve which projects axially outwardly of a side face of the outer bearing ring, which face is defined by an inner edge and an outer edge, the space for the balls between the inner and outer bearing rings being protected by sealing means mounted in said space inwardly of the side face of the outer ring against entrance of water and dirt, said bearing comprising a first washer secured to the outwardly projecting end of the inner sleeve-shaped bearing ring, the outer periphery of said washer extending past the inner edge of the outer bearing ring, said washer adjoining the side face of the outer bearing ring, and a second protection means including a flocculent coating arranged on the inside of said first washer.

4. Seal for a generally annular gap between at least a pair of relatively rotatable or reciprocatory machine members, one member having at least one continuous perimeter surface portion located in the gap or in contiguity to the gap, and the other member having a corresponding surface portion located in the gap or in contiguity to the gap, respectively, characterized by a first coating of an adhesive material applied to said one surface portion, and a second coating of a multitude of closely spaced short, flexible, electrostatically deposited fibers of a generally equal length supported in said adhesive material, and said fibers being generally similarly oriented with respect to said one surface portion, each fiber being independently secured solely at one end by said adhesive to said one surface portion, and at least a plurality of the free fiber ends in anti-frictional contact with said corresponding surface portion of said other member, said fibers sealing said generally annular gap between said machine members when said members are stationary and during any relative rotating or reciprocating movement thereof.

5. Seal according to claim 4, characterized in that said one member is a shaft member, said other member being a partition member having a bore, the shaft member passing through the bore.

6. Seal according to claim 4, characterized in that said shaft member is a shaft, said bore having an annular wall, said one continuous perimeter surface portion being the peripheral surface of a shaft section surrounded by the annular wall, and at least part of the annular wall constituting said corresponding surface portion.

7. Seal according to claim 4, characterized in that said one member is a ring member adapted to be secured to the rotating race ring, preferably the inner race ring, of an anti-friction bearing having an inner and an outer race ring and a sealing member extending between the race rings, and secured to the nonrotating race ring, the sealing member constituting at least part of said other member, the ring member having an axial end face adapted to face the sealing member and constituting said one continuous perimeter surface portion, at least part of said corresponding surface portion being located on said sealing member.

8. Seal according to claim 4, characterized in that said one member is a ring member adapted to be secured to one of the race rings of an anti-friction bearing having two race rings, the ring member having an annular surface portion constituting said one continuous perimeter surface portion, at least part of said annular surface portion facing a ring-shaped surface portion provided on the other race ring, said other race ring constituting at least part of said other member, and the ring-shaped surface portion constituting at least part of said corresponding surface portion.

9. The seal according to claim 4 wherein said one member is an end plate (20) of a linear motion bearing housing having a bore conforming to the cross section of a beam member of double T-shaped cross section.

10. Seal for a generally annular gap between a pair of relatively movable members, one member having at least one continuous perimeter surface portion located in the gap or in contiguity to the gap, and the other member having a corresponding surface portion located in the gap or in contiguity to the gap, respectively, characterized in that said one surface portion is provided with a first coating of an adhesive material and a second coating of a multitude of closely spaced flexible fibers of generally equal length, each fiber having one end secured to a surface element of said one surface portion by means of the adhesive and at least a plurality of free fiber ends wiping lightly in anti-frictional contact with said corresponding surface portion of said other member, said one member being a shaft, said other member being a partition member having a bore through which the shaft passes, said bore having an annular wall, said one continuous perimeter surface portion being the peripheral surface of a shaft section surrounded by said annular wall, and at least part of said annular wall constituting said corresponding surface portion, said annular wall having a central annular groove adapted to serve as a lubricant reservoir.

11. Seal according to claim 10, characterized in that the bore enters from a substantially radial surface of the partition, a resilient ring being located at the entrance of the bore, and part of the substantially radial surface constituting part of said corresponding surface portion.

12. Seal according to claim 10, characterized in that the resilient ring is a dividable garter spring having, in divided condition, a tapered end screwable into the other end for forming a closed ring, the non-tapered exterior surface of the dividable garter spring being completely covered by the coating of fibers, and the coils of the garter spring enclosing a space adapted to serve as a grease reservoir.

13. Seal according to claim 10, characterized in that the grooved ring has an inner surface facing the shaft and carrying a further coating of substantially radially extending fibers similar to said second coating, the free fiber ends of the further coating contacting the shaft or a member secured to the shaft, whereby the grooved ring is rotatable in relation to the shaft and also axially displaceable in relation to the shaft.

14. Seal for a generally annular gap between a pair of relatively movable members, a partition member having a bore, a ring member seated in the bore having one continuous perimeter surface portion located in the gap or in contiguity to the gap, and a rod member passing through said bore having a corresponding surface portion located in the gap or in contiguity to the gap, respectively, characterized in that said one surface portion is provided with a first coating of an adhesive material and a second coating of a multitude of closely spaced flexible fibers of generally equal length, each fiber having one end secured to a surface element of said one surface portion by means of the adhesive and at least a plurality of the free fiber ends wiping lightly in anti-frictional contact with said corresponding surface portion of said other member.

15. Seal for a generally annular gap between a pair of relatively movable members, a partition member having a bore and including an annular disc member having at its inner periphery two oppositely and axially facing flat annular surface portions, each such surface portion constituting one continuous perimeter surface portion located in the gap or in contiguity to the gap and a rod member passing through said bore and comprising a shaft and a groove ring of substantially U-shaped cross section surrounding the shaft, the grooved ring incorporating two annular pieces of substantially L-shaped cross sections, one of the annular pieces having a slightly larger inner diameter than the other at the bottom portion of the L, the bottom portions engaging each other radially to form the grooved ring, the annular disc member extending at its inner periphery into the groove but spaced from the side walls and bottom of the groove, at least part of each of said side walls of the groove constituting a corresponding surface portion located in the gap or in contiguity to the gap, characterized in that said one surface portion is provided with a first coating of an adhesive material and a second coating of a multitude of closely spaced flexible fibers of generally equal length, each fiber having one end secured to a surface element of said one surface portion by means of the adhesive and at least a plurality of the free fiber ends wiping lightly in anti-frictional contact with said corresponding surface portion of said other member.

16. Seal for a generally annular gap between at least a pair of relatively rotatable or reciprocatory machine members, one member having at least one continuous perimeter surface portion located in the gap or in contiguity to the gap, and the other member having a corresponding surface portion located in the gap or in contiguity to the gap, said members comprising at least a pair of annular members of generally L-shaped cross section each comprising a dished body portion and a generally cylindrical portion angularly disposed relative to said dished body portion, one of said annular members adapted to be mounted at its cylindrical portion in a bore in a housing and the other annular member adapted to be mounted at its cylindrical portion on a shaft member passing through the bore, said dished body portions of said annular members having confronting face portions, at least a part of one of the face portions constituting said one continuous perimeter surface portion and the other face portion constituting at least part of said corresponding surface portion, characterized by a first coating of an adhesive material applied to said one surface portion, and a second coating of a multitude of closely spaced, flexible, electrostatically deposited fibers of generally equal length supported in said adhesive material, each fiber being independently secured solely at one end by said adhesive to said one surface portion, and at least a plurality of the free fiber ends in anti-frictional contact with said corresponding surface portion of said other member.

17. Seal according to claim 16 wherein said dished body portion of one of said annular members is located entirely within a space defined axially by the dished body portion of said other annular member and a radial plane through the outer free terminal edge of the cylindrical portion of said other annular member.

18. Seal according to claim 16 wherein the inner diameter of said one annular member is slightly larger than the outer diameter of the cylindrical portion of said other annular member and the outer diameter of said other annular member is slightly smaller than the inner diameter of the cylindrical portion of said one annular member.

19. A track roller journalled on a shaft by a roller bearing comprising an inner ring fitted on the shaft and an outer ring fitted in the track roller and a plurality of rolling elements in the annular space between the rings, a closure member fitted on the shaft having an axial end face abutting the inner ring, means defining an annular groove in the closure member having two cylindrical side surfaces disposed concentrically with the shaft and a bottom surface extending radially with respect to the shaft axis, a seal ring mounted in the track roller and having an axial end portion conforming in shape to the annular groove and of a smaller dimension to provide a gap therebetween, said seal ring surfaces having a coating of an electrostatically deposited fiber flock bonded thereto by an adhesive, the free ends of said fibers being in anti-frictional contact with the sides and bottom of said groove.

20. The assembly as claimed in claim 19 wherein the grooved bottom surface is stepped in a radial direction to define an annular space providing a lubricant reservoir.

21. In a railway axle box mounted on a shaft, a roller bearing having an inner ring fitted on said shaft and an outer ring fitted on the body portion of the axle box housing, an end cover secured to one end of the body portion and supporting the outer ring axially in one direction, a collar fitted on the shaft extending through the bore and supporting the inner ring axially in said one direction, means defining a pair of axially spaced, annular grooves in the outer cylindrical surface of said collar, said end cover having an inner circumferentially extending surface overlying said grooves, a seal comprising at least one spring member circumscribing said collar and engageable on each of said grooves, said spring member having a multitude of closely spaced, flexible, electrostatically deposited fibers of generally equal lengths supported in an adhesive material applied to said spring member and projecting generally radially therefrom, the free fiber ends wiping lightly in anti-frictional contact with said groove and said inner circumferential surface of said end cover.

22. A bearing unit mounted on a journal comprising inner and outer rings and a plurality of rolling elements in the annular space between the rings, a collar fitted on the journal to one side of said bearing, means defining an annular groove in the collar, a seal ring of pressed sheet metal having a generally cylindrical end portion engageable in the bore of the outer ring, the other end portion being of substantially square-edged, generally C-shaped cross section and conforming to the groove in the collar, a coating of electrostatically deposited fiber flock bonded to said other end portion with the free fiber ends in anti-frictional contact with the bore in said collar.

23. Seal for a generally annular gap between a pair of relatively movable members, one member having at least one continuous perimeter surface portion located in the gap or in contiguity to the gap, and the other member having a corresponding surface portion located in the gap or in contiguity to the gap, respectively, characterized in that said one surface portion is provided with a first coating of an adhesive material and a second coating of a multitude of closely spaced flexible fibers of generally equal length, each fiber having one end secured to a surface element of said one surface portion by means of the adhesive and at least a plurality of the free fiber ends wiping lightly in anti-frictional contact with said corresponding surface portion of said other member, said one member being a shaft member including a shaft and a lip seal ring supported at least indirectly by said shaft and said other member being a partition member having a bore through which said shaft member passes, said lip seal ring having at least one annular sealing lip disposed concentrically with respect to the axis of said shaft and bore and rubbingly engaging an annular sealing surface provided on said partition member, said sealing lip having at least one annular surface slanting towards said annular sealing surface, at least part of said slanting surface constituting said one perimeter surface portion, and at least part of the sealing surface constituting said corresponding surface portion, the sealing surface preferably being perpendicular to said axis.

* * * * *